United States Patent Office 3,415,893
Patented Dec. 10, 1968

3,415,893
PRODUCTION OF SYNTHETIC PINE OIL
Henry G. Sellers, Jr., Pensacola, and William C. Doyle, Jr., Gulf Breeze, Fla., assignors to Tenneco Chemicals, Inc., a corporation of Delaware
No Drawing. Filed Nov. 13, 1963, Ser. No. 323,206
8 Claims. (Cl. 260—631.5)

The present invention relates to improvements in the process of producing synthetic pine oil from α-pinene and terpene compositions containing α-pinene.

Synthetic pine oil has been prepared from turpentine and the like. However, the prior art processes have, in general, resulted in low yields or presented various problems tending to increase the cost of production. For example, U.S. Patent No. 2,295,705 describes a process of contacting turpentine with dilute acid in the presence of an emulsifying agent to produce a large amount of terpin hydrate which is a solid and which can be converted to the alcohols. This procedure presents a number of difficulties including the necessary step of converting the hydrate to the alcoholic form. In addition, when such a process is carried out on a large scale, the terpin hydrate precipitate presents a serious handling problem including the clogging of pipes and valves.

It has been discovered that α-pinene can be converted into synthetic pine oil without the formation of substantial amounts of terpin hydrate solids by contacting the α-pinene with aqueous sulfuric acid of a particular concentration and at a specified temperature for a relatively short period of time. The concentration of the acid as well as the temperature are critical and must be held within relatively narrow limits to avoid the formation of terpin hydrate and to obtain a high yield of a reaction products containing a high yield of alcohols relative to the amount of non-alcoholic byproducts produced during the reaction.

In the present process the α-pinene and aqueous sulfuric acid containing emulsifier are agitated under controlled temperature conditions until the content of terpene alcohols reaches the maximum. The oil and aqueous phases are then separated and the oil phase is then washed with water containing a basic material to neutralize any residual acid. Preferably the basic material is one that is soluble in water and one which will form water-soluble salts upon reaction with the sulfuric acid. The oil phase is then distilled to separate the pine oil product from the unreacted α-pinene and other terpenes, if present, as well as from the byproducts of the reaction. During the distillation the unreacted terpene material and the byproducts may be separated from each other. The byproducts are primarily monocyclic hydrocarbons containing some cineols, cyclic ethers, and other undesirable products of the reaction. The by-product portion is a useful solvent. The unreacted terpenes may be re-used.

The pine oil produced by the present process is essentially composed of terpene alcohols and contains at least 60% and preferably 70%, or more, of α-terpineol. The other terpene alcohols present include terpinent-4-ol, β-fenchol, β-terpineol, isoborneol, and borneol. Normally there will be some hydrocarbons and other byproducts present, preferably not exceeding 15% by weight of the pine oil.

Substantially pure α-pinene may be used as the starting material. Turpentine containing 50%, or more, α-pinene is quite satsifactory. Wood turpentine contains a high percentage of α-pinene and such a turpentine containing 65%, or more, α-pinene with the remainder being mostly camphene is a commercially available material which may be used. α-Pinene containing about 5% β-pinene also has been used. A higher content of β-pinene has no deleterious effect.

The reaction conditions including the proportions of reactants are quite important in order to obtain the desired maximum yield of oil containing a maximum of alcohols. The temperature and the concentration of the aqueous sulfuric acid are critical and the optimum temperature is influenced by the acid concentration and vice versa. In general, the temperature during the reaction should be in the range of 35°–45° C. with the preferred temperature being in the range of 37°–43° C. At lower temperatures large amounts of undesirable terpin hydrate are produced and relatively lengthy reaction periods are required. At higher temperatures there is an increase in the formation of byproducts and it becomes more difficult to separate the oil phase.

The concentration of the aqueous sulfuric acid is critical. As used herein, the term "aqueous sulfuric acid" is applied to sulfuric acid essentially composed of $H_2SO_4$ and water, and the percent sulfuric acid is based on the weight of $H_2SO_4$ in the aqueous sulfuric acid. Thus, 38% aqueous sulfuric acid contains 38% sulfuric acid and about 62% water. While aqueous sulfuric acid containing 35–45% sulfuric acid may be used, preferably the concenitrtaion of the acid is in the range of 37–42%. Lowering the acid concentration results in the formation of terpin hydrate. Increasing the acid concentration decreases the raito of alcohols to hydrocarbons in the oil phase and results in reduced separability of oil and aqueous phases. The higher concentration in the aforesaid ranges reduces the temperature at which terpin hydrate formation is a problem. Better results are obtained when the lower reaction temperatures of those described as useful are used with higher acid concentration of those described as useful. Best results are obtained when the sum of the reaction temperature in ° C. plus the percent acid concentration is in the range of 75–83 with the optimum conditions being when this sum is in the range of 77–80. When the reaction is carried out at 40° C. with 38.5% aqueous sulfuric acid, the sum is 78.5.

The proportion of aqueous sulfuric acid to terpene material is not as critical as the temperature and concentration conditions. Small amounts of aqueous sulfuric acid reduce the rate of reaction unduly while quite large amounts of aqueous sulfuric acid reduce separation of the phases and the yield of alcohol. The ratio of aqueous sulfuric acid to terpene material may be in the range of from 2:1 to 1:2. However, the preferred range is from 1.5:1 to 1:1.5. Optimum results have been obtained with about equal volumes of these two materials.

The presence of an emulsifier in the aqueous sulfuric acid is necessary to promote the reaction. Preferably nonionic emulsifiers are used which are soluble in the aqueous phase and substantially insoluble in the organic phase. Emulsifiers soluble in the organic phase present a number of serious problems including making it very difficult to separate the organic phase containing the reaction products from the aqueous phase. By using an emulsifier not soluble in the organic phase, there are no substantial amounts of emulsifier in the pine oil product. The emulsifier remains in the sulfuric acid and both the acid and the emulsifier can be reused. Any nonionic, oil-in-water type of emulsifying agent may be used which is substantially insoluble in the organic phase, the terpene starting material or the alcoholic reaction product. Illustrative emulsifiers are the alkyl phenyl ethers of polyethylene glycols, for example, the nonyl phenyl ether of polyethylene glycol (Tergitol NPX) which is a nonyl phenol-ethylene oxide condensate. The amount of emulsifier used depends upon the amount of aqueous sulfuric acid and to some extent upon the particular emulsifier used. While an amount of emulsifier in the range of 0.05% to 1% may be used, better results are obtained with an amount in the range of 0.1% to 0.5% with the optimum amount of the previously mentioned emulsifier being 0.2% ±0.05%.

Normally the α-pinene will be maintained in contact with the acid until the α-pinene content of the organic phase has been reduced to about 10%. This reaction will require less than 3½ hours and usually less than 3 hours. Better yields are obtained by interrupting the reaction when the alcohol content of the organic phase reaches a peak. As the reaction proceeds the α-pinene content is reduced, the alcohol content rises to a peak, and thereafter the alcohol content decreases. Throughout the reaction period the amount of byproducts, mostly hydrocarbons, increases and after the peak alcohol content is reached, the hydrocarbon content continues to increase and the alcohol content decreases. The peak alcohol content can be determined by analysis at periodic intervals as the reaction proceeds. The samples of oil may be analyzed by gas-liquid partition chromatography. Alternatively, the peak alcohol content can be determined by the refractive index of the oil. The refractive index increases to a peak when the alcohol content also is at its peak. Thereafter, the refractive index decreases as does the alcohol content when the reaction is continued. The reaction may be stopped when the peak alcohol content is reached by cooling the reaction mixture or by drowning with water. If the reaction is interrupted slightly before the peak alcohol content is reached, the alcohol fraction of the oil will contain a somewhat higher percentage of α-terpineol. Once the period required to reach the peak alcohol content is determined for a particular starting material and a particular set of reaction conditions, this period can be used for controlling further reactions under the same conditions.

In the following examples all percentages and ratios are by weight except the relative amounts of turpentine and aqueous sulfuric acid which are by volume. The turpentine used was wood turpentine and it contained 85% α-pinene with the remainder consisting primarily of camphene.

EXAMPLE 1

A series of runs were made at different reaction temperatures with varying concentrations of sulfuric acid as indicated in Table I. In each instance equal volumes of wood turpentine and fresh aqueous sulfuric acid containing 0.22% of emulsifier were stirred at a constant reaction temperature. The emulsifier was the nonyl phenyl ether of polyethylene glycol. At intervals, samples of the emulsion were withdrawn and the oil phase separated and analyzed by gas-liquid partition chromatography (GLPC). When the α-pinene content of the oil had fallen to about 10%, the emulsion was allowed to separate. The separated oil phase was washed with half of its volume of 10% aqueous sodium hydroxide, filtered, and weighed. For those runs containing terpin hydrate, this solid was filtered by suction, washed with water and then hexane, and finally dried. In the following table the percent unreacted starting material is set forth under the heading "α-Pinene+camphene."

TABLE I

| Run | Temperature (°C.) | Time to peak alcohol (hours) | Wt. percent yield [1] | | Analysis (GLPC area percent) at peak alcohol content | | | Ratio of alcohols to byproducts |
|---|---|---|---|---|---|---|---|---|
| | | | Oil | Terpin hydrate | α-Pinene+ camphene | Byproducts | Alcohols | |
| 37% H₂SO₄: | | | | | | | | |
| A | 35 | 6.0 | (²) | 34 | 27 | 41 | 32 | 0.78 |
| B | 40 | 2.5 | 78 | 2 | 38 | 24 | 38 | 1.38 |
| C | 45 | 2.3 | 93 | 0 | 29 | 37 | 34 | 0.95 |
| D | 50 | 1.3 | 62 | 0 | 38 | 34 | 28 | 0.70 |
| 40% H₂SO₄: | | | | | | | | |
| E | 35 | 2.0 | 84 | ³0 | 37 | 33 | 30 | 0.94 |
| F | 40 | 1.8 | 88 | ³0 | 26 | 36 | 38 | 1.06 |
| G | 45 | 0.8 | 87 | 0 | 42 | 28 | 30 | 0.74 |
| 42% H₂SO₄: | | | | | | | | |
| H | 25 | 3.0 | (²) | 34 | 52 | 27 | 21 | 0.78 |
| I | 35 | 2.0 | 91 | ³0 | 27 | 38 | 35 | 0.90 |
| J | 40 | 1.0 | 91 | ³0 | 34 | 33 | 33 | 1.00 |
| 45% H₂SO₄: | | | | | | | | |
| K | 25 | 2.3 | (²) | 21 | 34 | 40 | 26 | 0.74 |
| L | 30 | 1.3 | 70 | Trace | 31 | 38 | 31 | 0.61 |
| M | 35 | 1.3 | 92 | 0 | 22 | 49 | 29 | 0.59 |
| 48% H₂SO₄: | | | | | | | | |
| N | 25 | 2.0 | 53 | 0 | 27 | 48 | 25 | 0.53 |
| O | 30 | 1.7 | 69 | 0 | 20 | 55 | 25 | 0.44 |
| P | 35 | 1.3 | 91 | 0 | 22 | 49 | 29 | 0.44 |

[1] Yields of oil were determined at the end of the reaction past the point of peak alcohol content.
[2] It was impractical to determine the yield of oil for those runs producing large amounts of terpin hydrate.
[3] Small amounts of terpin hydrate were noted only during the early part of these runs.

For each of the runs in Table I, small portions of the oil phase were analyzed (GLPC) and in Table I-A the results are set forth for Run B.

TABLE I-A

| Reaction period (hours) | Refractive index | Percent oil content | | |
|---|---|---|---|---|
| | | α-Pinene+ camphene | Byproducts | Alcohols |
| 0 | 1.4641 | | | |
| 1 | 1.4677 | 67.5 | 12.5 | 20.0 |
| 2 | 1.4702 | 46.25 | 21.25 | 32.5 |
| 2.5 | 1.4709 | 38 | 24 | 38 |
| 3 | 1.4707 | 35 | 28.5 | 36.5 |
| 4 | 1.46975 | 30 | 37.5 | 32.5 |

EXAMPLE 2

Comparative runs were made in the same general manner as described in Example 1. These runs were made at 40° C. using 42% and 38.5% aqueous sulfuric acid containing 0.22% of the same emulsifier as used in Example 1. The proportions of turpentine and acid were varied as indicated.

TABLE II

| Run | Acid:oil | Time to peak alcohol (hours) | Wt. percent yield | |
|---|---|---|---|---|
| | | | Oil | Terpin hydrate |
| 42% H₂SO₄: | | | | |
| Q | 1:2 | 2.5 | 95 | 0 |
| R | 1:1 | 1.0 | 91 | 0 |
| S | 2:1 | 0.7 | 69 | 0 |
| 38.5% H₂SO₄: | | | | |
| T | 1:2 | 4.5 | 93 | 0 |
| U | 1:1 | 2.5 | 93 | 0 |
| V | 2:1 | 1.0 | 83 | 0 |

| Run | Oil analysis (at peak alcohol content) | | | Ratio of alcohols to byproducts |
| --- | --- | --- | --- | --- |
| | α-Pinene + camphene | Byproducts | Alcohols | |
| 42% H₂SO₄: | | | | |
| Q | 38 | 37 | 25 | 0.68 |
| R | 34 | 33 | 33 | 1.00 |
| S | 25 | 45 | 30 | 0.67 |
| 38.5% H₂SO₄: | | | | |
| T | 32 | 33 | 35 | 1.06 |
| U | 29 | 33 | 38 | 1.15 |
| V | 31 | 31 | 38 | 1.22 |

The effect of variations in the acid to oil ratio was not large. Increasing the ratio of acid does accelerate the reaction but the separability of the two phases is decreased.

EXAMPLE 3

A series of six runs were made in which the acid was reused five times and each time the acid was readjusted to the original concentration of 38.5% ±0.3%. The amounts of turpentine and aqueous sulfuric acid were 350 ml. each and the reaction temperature was 40° C. Refractive index measurements were used to stop the reaction at or near the peak alcohol content. The original acid contained 0.22% emulsifier and for each run sufficient emulsifier was added to replace the estimated amount of emulsifier used. The results are summarized in Table III.

TABLE III

| Run | Time (hours) | Oil yield (wt. percent) | Product analysis (GLPC area percent) | | |
| --- | --- | --- | --- | --- | --- |
| | | | α-Pinene+ camphene | Byproducts | Alcohols |
| W | 2.5 | 87 | 29 | 37 | 34 |
| W-1 | 2.5 | 98 | 27 | 39 | 34 |
| W-2 | 2.0 | 98 | 37 | 22 | 31 |
| W-3 | 2.5 | 93 | 51 | 27 | 22 |
| W-4 | 2.5 | 99 | 30 | 34 | 36 |
| W-5 | 2.0 | 100 | 27 | 42 | 31 |
| Average analysis | | | 33 | 35 | 32 |

| Run | Ratio of alcohol to byproducts | |
| --- | --- | --- |
| | Final | At peak alcohol |
| W | 0.92 | 0.92 |
| W-1 | 0.87 | 1.06 |
| W-2 | 0.97 | 0.96 |
| W-3 | 0.82 | 1.09 |
| W-4 | 0.95 | 1.12 |
| W-5 | 0.74 | 1.10 |
| Average analysis | 0.92 | 1.04 |

EXAMPLE 4

In order to produce synthetic pine oil low in terpinene-4-ol two runs, X–1 and X–2, were made with 38% aqueous sulfuric acid containing 0.22% emulsifier at 40° C. and at a 1:1 acid:oil ratio. The reaction was stopped prior to reaching the peak alcohol content and the oils contained an average of 53% α-pinene and camphene, 25% alcohols, and 22% hydrocarbon byproducts. The combined oils were fractionated and analyzed as were the combined oils from Runs W through W–5 (Example 3 Runs). The results are set forth in Table IV.

TABLE IV.—GLPC Area Percent

| | X-1+X-2 | Ex. 3 Runs |
| --- | --- | --- |
| Hydrocarbons | 11.1 | 9.5 |
| Unknown | 1.4 | 1.6 |
| Terpinene-4-ol | 4.2 | 14.7 |
| β-Fenchol | 1.1 | 1.0 |
| Unknown | 1.7 | 2.8 |
| β-Terpineol | 2.2 | 2.4 |
| Iso Borneol | 2.0 | 3.4 |
| α-Terpineol | 75.0 | 62.7 |
| Borneol | 1.3 | 1.9 |

We claim:

1. The process of producing terpene alcohols from α-pinene comprising agitating a mixture essentially consisting of a volume of terpene material containing α-pinene with from 1.5 to 0.75 volumes of aqueous sulfuric acid containing from 37% to 45% by weight of sulfuric acid and from 0.1 to 0.5% by weight of a nonionic emulsifying agent soluble in the aqueous sulfuric acid and substantially insoluble in the organic phase and at a temperature of from 37° to 43° C., thereby forming a reaction mixture substantially free of terpin hydrate and containing terpene alcohols.

2. The process of producing terpene alcohols from α-pinene comprising agitating a mixture essential consisting of a volume of terpene material containing α-pinene with an equal volume of aqueous sulfuric acid containing from 38% to 39% by weight of sulfuric acid and from 0.15% to 0.25% by weight of a nonionic emulsifying agent soluble in the aqueous sulfuric acid and substantially insoluble in the organic phase and at a temperature of about 40° C., thereby forming a reaction mixture substantially free of terpin hydrate and containing terpene alcohols.

3. The process of producing terpene alcohols from α-pinene comprising agitating a mixture essentially consisting of a volume of turpentine containing at least 65% α-pinene with from 1.5 to 0.75 volumes of aqueous sulfuric acid containing from 37% to 42% by weight of sulfuric acid and from 0.1% to 0.5% by weight of a nonionic emulsifying agent soluble in the aqueous sulfuric acid and substantially insoluble in the organic phase and at a temperature of from 37° to 43° C., thereby forming a reaction mixture substantially free of terpin hydrate and containing terpene alcohols.

4. The process of producing terpene alcohols from α-pinene comprising agitating a mixture essentially consisting of a volume of turpentine containing at least 65% α-pinene with about an equal volume of aqueous sulfuric acid containing from 38% to 39% by weight of sulfuric acid and from 0.15% to 0.25% by weight of a nonionic emulsifying agent soluble in the aqueous sulfuric acid and substantially insoluble in the organic phase and at a temperature of about 40° C. and for a period of less than three hours, thereby forming a reaction mixture substantially free of terpin hydrate and containing terpene alcohols.

5. The process of producing synthetic pine oil containing at least 85% or terpene alcohols from α-pinene comprising agitating a mixture essentially consisting of a volume of terpene material containing α-pinene with from 1.5 to 0.75 volumes of aqueous sulfuric acid containing from 37% to 42% by weight of sulfuric acid and from 0.1% to 0.5% by weight of a nonionic emulsifying agent soluble in the aqueous sulfuric acid and substantially insoluble in the organic phase and at a temperature of from 37° to 43° C., continuing the agitation of the mixture at such temperature until the alcohol content is about the maximum, cooling the resulting emulsion and separating the aqueous phase from the organic oil phase, said organic oil phase being free of terpin hydrate, and thereafter separating from the oil phase the synthetic pine oil.

6. The process of producing synthetic pine oil comprising agitating a mixture essentially consisting of a volume of turpentine containing at least 50% α-pinene with from 1.5 to 0.75 volumes of aqueous sulfuric acid containing from 37% to 42% by weight of sulfuric acid and from 0.1% to 0.5% by weight of a nonionic emulsifying agent soluble in the aqueous sulfuric acid and substantially insoluble in the organic phase and at a temperature of from 37° to 43° C., continuing the agitation of the mixture at such temperature until the alcohol content is at about the maximum, cooling the resulting emulsion and separating the aqueous phase from the organic oil phase, said organic oil phase being free of terpin hydrate, and thereafter separating from the oil phase a synthetic pine oil containing at least 60% by weight of α-terpineol 7. The process of producing synthetic pine oil comprising agitating a mixture essentially consisting of a volume of wood turpentine containing α-pinene with about an equal volume of aqueous sulfuric acid containing from 38% to 39% by weight of sulfuric acid and from 0.15% to 0.25% by weight of a nonionic emulsifying agent soluble in the aqueous sulfuric acid and substantially insoluble in the organic phase and at a temperature of about 40° C., continuing the agitation of the mixture at such temperature until the alcohol content is at about the maximum, cooling the resulting emulsion and separating the aqueous phase from the organic oil phase, said organic oil phase being free of terpin hydrate, and thereafter separating from the oil phase synthetic pine oil containing at least 60% by weight of $\alpha$-terpineol.

8. The process of producing synthetic pine oil containing at least 60% $\alpha$-terpineol and at least 85% terpene alcohols comprising agitating a mixture essentially consisting of a volume of wood turpentine containing $\alpha$-pinene with from 1.5 to 0.75 volumes of aqueous sulfuric acid containing from 37% to 42% by weight of sulfuric acid and from 0.1% to 0.5% by weight of a nonionic emulsifying agent soluble in the aqueous sulfuric acid and substantially insoluble in the organic phase and at a temperature of from 37° to 43° C., interrupting the reaction before the alcohol content reaches the maximum, cooling the resulting emulsion and separating the aqueous phase from the organic oil phase, said organic oil phase being free of terpin hydrate, and thereafter separating from the oil phase the synthetic pine oil.

References Cited
UNITED STATES PATENTS

| | | | |
|---|---|---|---|
| 2,178,349 | 10/1939 | Sheffeld | 260—631.5 |
| 2,898,380 | 8/1959 | Herrlinger | 260—631.5 |

LEON ZITVER, *Primary Examiner.*

T. G. DILLAHUNTY, *Assistant Examiner.*